(12) United States Patent
Fireaizen et al.

(10) Patent No.: US 12,487,310 B2
(45) Date of Patent: Dec. 2, 2025

(54) DIRECTION FINDER ANTENNA SYSTEM

(71) Applicant: Elta Systems Ltd., Ashdod (IL)

(72) Inventors: Moshe Fireaizen, Kfar Saba (IL); Aharon Razon, Tel-Aviv (IL)

(73) Assignee: Elta Systems Ltd., Ashdod (IL)

( * ) Notice: Subject to any disclaimer, the term of this patent is extended or adjusted under 35 U.S.C. 154(b) by 0 days.

(21) Appl. No.: 18/553,302

(22) PCT Filed: Mar. 27, 2022

(86) PCT No.: PCT/IL2022/050335
§ 371 (c)(1),
(2) Date: Sep. 29, 2023

(87) PCT Pub. No.: WO2022/215064
PCT Pub. Date: Oct. 13, 2022

(65) Prior Publication Data
US 2024/0201305 A1    Jun. 20, 2024

(30) Foreign Application Priority Data

Apr. 6, 2021  (IL) .......................................... 282125
Oct. 5, 2021  (IL) .......................................... 287016

(51) Int. Cl.
*G01S 5/04* (2006.01)
*G01S 3/46* (2006.01)
(Continued)

(52) U.S. Cl.
CPC .................... *G01S 3/46* (2013.01); *G01S 3/48* (2013.01); *G01S 5/04* (2013.01); *G01S 5/06* (2013.01); *G01S 3/465* (2013.01); *G01S 3/72* (2013.01)

(58) Field of Classification Search
CPC ... G01S 3/46; G01S 3/48; G01S 3/465; G01S 3/72; G01S 5/04; G01S 5/06
(Continued)

(56) References Cited

U.S. PATENT DOCUMENTS 4,854,502 A  8/1989  Cox
5,189,429 A  2/1993  Guard
(Continued)

FOREIGN PATENT DOCUMENTS

IL          222095 A      3/2014
JP    2018132430 A  *  8/2018  ............... H01Q 3/04
(Continued)

OTHER PUBLICATIONS

International Preliminary Report on Patentability for International Application No. PCT/IL2022/050335 mailed Apr. 25, 2023.
(Continued)

*Primary Examiner* — Chuong P Nguyen
(74) *Attorney, Agent, or Firm* — Ballard Spahr LLP

(57) ABSTRACT

A direction finder antenna system and method are described. The direction finder antenna system comprises a rotatable platform comprising at least two antenna units at selected distance between them, a motor configured for moving the rotatable platform at a motion pattern, and a signal collection circuit configured for receiving data on signal portions collected by said at least two antenna units with respect to different angular positions of said at least two antenna units. The signal collection circuit generates output data indicative of direction of origin of collected signal.

31 Claims, 4 Drawing Sheets

(51) Int. Cl.
  *G01S 3/48* (2006.01)
  *G01S 5/06* (2006.01)
  *G01S 3/72* (2006.01)
(58) Field of Classification Search
  USPC ........ 342/465, 417, 445, 442, 428, 430, 449
  See application file for complete search history.

(56) References Cited

U.S. PATENT DOCUMENTS

| | | | | |
|---|---|---|---|---|
| 5,943,013 | A * | 8/1999 | Ohashi | G01S 3/043 |
| | | | | 342/417 |
| 6,034,634 | A * | 3/2000 | Karlsson | H01Q 3/08 |
| | | | | 342/359 |
| 6,437,742 | B1 | 8/2002 | Niesen et al. | |
| 6,914,559 | B2 * | 7/2005 | Marks | G01S 3/48 |
| | | | | 342/430 |
| 9,606,213 | B2 | 3/2017 | Meiman | |
| 9,778,368 | B2 * | 10/2017 | Krantz | H01Q 9/28 |
| 10,539,650 | B2 * | 1/2020 | Zhong | H01Q 3/02 |
| 10,847,897 | B2 * | 11/2020 | Almog | H01Q 21/205 |
| 2005/0062647 | A1 * | 3/2005 | Marks | G01S 3/48 |
| | | | | 342/428 |
| 2005/0242991 | A1 * | 11/2005 | Montgomery | G01S 19/396 |
| | | | | 342/357.36 |
| 2018/0145407 | A1 * | 5/2018 | Natsume | H01Q 3/08 |
| 2019/0115957 | A1 * | 4/2019 | Rydström | H01Q 1/125 |

FOREIGN PATENT DOCUMENTS

| | | | |
|---|---|---|---|
| KR | 20170047773 A | 5/2017 | |
| WO | WO-2012104201 A1 * | 8/2012 | ......... G01S 13/4454 |

OTHER PUBLICATIONS

International Search Report and Written Opinion for International Application No. PCT/IL2022/050335 mailed Jul. 5, 2022.

* cited by examiner

DIRECTION FINDER ANTENNA SYSTEM

TECHNOLOGICAL FIELD

The present invention is in the field of antenna systems and relates to direction finding antenna systems.

BACKGROUND

Direction-finding antenna systems are used in various fields. A direction-finding antenna system is generally configured to collect electromagnetic signals, such as radio frequency (RF) signal, and provide output data on relative direction of origin of the collected signal. Various direction-finding antenna systems utilize an array of two or more antenna elements, located at selected positions with predetermined arrangement. The different antenna elements collect input signal with different phases and amplitudes, thereby enabling to reconstruct data on the direction from which the signal was transmitted.

Various techniques have been described, providing broadband direction-finding antenna system. Some of these techniques utilize conical antenna units, partial cone antenna as well as Vivaldi type antenna units etc.

GENERAL DESCRIPTION

Typical direction-finding antenna systems are configured for determining data on direction of signal for a relatively narrow bandwidth. This may be associated with ambiguity generated due to number of phase cycles between signal portions.

Thus, there is a need in the art for a direction-finding (DF) antenna system capable of determining direction of signal origin, while operating within a broad frequency band and eliminating or at least significantly reducing the need for calibration of the antenna system. The present invention utilizes an arrangement of two or more antenna units configured on a rotatable frame to provide data indicative of direction of origin of signal being collected thereby. The technique of the present invention enables broadband direction finding (typically associated with bandwidth of the antenna units) and can provide data on azimuth as well as elevation of the signal direction. The rotatable platform may be rotatable about at least an angular section within a selected plane. The rotatable platform may complete full rotation or capable of moving within a selected angular section, typically in a back and forth motion.

Accordingly, the present technique provides a DF antenna system comprising an arrangement of two or more antenna units positioned on a rotatable platform, at different locations or angular sections of the rotatable platform. The antenna units are configured for collecting electromagnetic signals (e.g., radiofrequency RF or microwave) of a selected frequency range and to transmit data on the collected signals to a signal collection circuit. The signal collection circuit is configured to receive input signals from the two or more antenna units and to determine data on relative phase difference between signal portions received by the different antenna units.

The two or more antenna units are positioned on the rotatable platform at selected distance(s) between them. Differently than a typical phased array antenna system, the distance between antenna units according to the present technique may be selected in accordance with preferred physical dimension of the system, while allowing to determine direction of origin for signal in broad range of frequencies. More specifically, in some embodiments the distance d between two antenna units may be in the range of 0.1-10 centimeters, providing a relatively small form factor of the system. In some embodiments the distance d may be selected to be 10-100 centimeter, providing a relatively large form factor of the system. In some additional embodiments, the distance d may be larger than 100 centimeters. It should be noted that the present technique enables to determine direction of origin of signals having wavelength that is much shorter or much longer than the distance d. Generally, in some configurations, the distance d between the antenna unit may preferably follow the condition $$2\pi\omega\Delta t \frac{d}{\lambda} < \frac{1}{2}$$

where d the distance between the antennae, $\lambda$ is wavelength of collected signal, $\omega$ is the angular velocity in rotations per second of the rotatable platform and $\Delta t$ the time step between two consequent pulses of input signal. This enables detection of direction of origin of input pulses within a portion of a cycle of the rotatable platform, e.g., quarter circle or half circle.

In operative mode of the DF antenna system, the rotatable platform is rotated at a selected angular frequency. The rotatable platform may complete full circles or cover a selected angular section in back-and-forth motion (e.g., oscillate). Generally, due to difference in position of the two or more antenna units, the antenna units collect signal portions with phase differences between them, where the phase differences are caused by changes in relative position between the antenna units and the signal origin. When rotating in full circles, the phase difference varies in accordance with angular position of the frame between a maximal phase difference when two antenna units are arranged along a line extending parallel to direction of propagation of the signal, and minimal (or zero) difference in absolute value, when two antenna units are arranged along a line extending perpendicular to direction of propagation of the signal. In embodiments where the rotatable platform operates in back-and-forth motion, maximal and minimal phase difference scenarios occur at certain orientations. Absolute maximal and minimal phase difference, or zero phase difference may occur if the covered angular section includes positions where the two antenna units are aligned along perpendicular or parallel lines with respect to a virtual line connecting the DF system and the signal origin. In this connection, the terms rotation, and plane of rotation as used herein relate to movement in back-and forth motion as well as to complete rotation motion and to a plane defined by motion of the rotatable platform.

It should be noted that the angular frequency of the rotating platform in the present invention may be selected within a broad frequency range. Generally, the angular frequency of rotation may determine the time required for the antenna system to determine direction of a signal source. Accordingly, angular frequency of rotation may be 1 Hz or lower, i.e., single rotation cycle per second or less than a complete rotation. In some other configuration, the angular frequency of rotation may be higher than 1 Hz. For example, the rotation speed of the platform may be 50-1000 RPM, or 60-500 RPM or 100-200 RPM. Generally, the rotation speed may be sufficiently slow so as to enable the signal collection unit to determine phase shift/delay between signal components collected by different antenna units as a function of angular position of the platform. The rotation speed parameter, or angular velocity ⓐ may be determined in accordance with signal parameters as described above with respect to distance between antenna units. Further, it should be understood that rotation, and/or back-and-forth motion, may utilize non-uniform angular velocity.

The two or more antenna units may be positioned at similar or different radial distances with respect to axis of rotation of the rotatable platform and may be positioned along a common diameter of rotation, or with certain angular relation between them.

In this connection, considering a plot of phase difference between signal portions collected by a pair of the antenna units as a function of angular position of the rotatable platform, the phase difference typically shows a sinusoidal wave structure. Shift of the sine wave with respect to a selected, zeroth, angular position of the platform, is indicative of azimuthal direction of origin of the signal within a plane of rotation. Typically, for antenna units being separated between them by a distance d, being in a range of wavelength of the collected signal or less, the phase difference completes about one circle during full rotation of the platform. For antenna units separated by distance greater than wavelength of the collected signal, the phase difference as function of angular position relation may include certain ambiguity due to the cyclic nature of phases. Such ambiguity may be solved utilizing selected angular frequency ω and antenna unit distance d satisfying the relation $$2\pi\omega\Delta t \frac{d}{\lambda} < \frac{1}{2}$$

as described above. Further, a preferred distance d between the antenna units may be selected to provide $$d < \frac{\lambda}{2},$$

thereby avoiding any ambiguity in phase difference. It should however be noted that the present technique may be operable with larger distance, and in some configurations may be used with distance d that is larger than the wavelength. Additionally, or alternatively, the system may include additional antenna units along the rotatable platform, and direction of signal origin can be determined using two antenna units having distance in the range of wavelength of the collected signal.

Configured to operate when rotating, the two or more antenna units may be configured as omnidirectional antenna units. Alternatively, the two or more antenna units may be configured as directional antenna units. Such directional antenna units are preferably positioned on respective rotatable antenna mounts configured to rotate in counter motion with respect to the rotatable platform. For example, the rotatable antenna mounts may be configured to rotate in an angular frequency being equal to angular frequency of rotation of the platform, while at opposite directions. This arrangement provides that the directional antenna units maintain heading toward a selected direction, typically selected as reference direction, i.e., azimuth zero.

The use of directional antenna units, over omnidirectional antenna units, provide improved signal to noise ratio when identifying direction of signal arriving within field of view of the antenna units. As the DF system utilizes rotatable platform, this may be solved by operating the system and occasionally or periodically vary direction of reference (zero azimuth) to scan for directions from which signal may arrive.

In additional to data on azimuth of signal origin, within plane of rotation, the present technique may also provide data indicative of elevation of the signal origin with respect to the plane of rotation. This is associated with analyzing the changes in phase difference between signal portions collected by different antenna units along rotation of the platform. More specifically, signal originating from a source within the plane of rotation shows greater phase difference between antenna units as compared to signal originating from the source positioned at certain elevation with respect to the plane of rotation. Accordingly, magnitude of the phase difference as a function of angular position is indicative to elevation of the signal origin with respect to the plane of rotation. This is associated with geometrical variation of the signal path between the antenna units for elevation of the signal source. Generally, the DF antenna system may be positioned at a horizontal plane or any other plane (e.g., parallel to the ground at a selected terrain). Data on azimuth and elevation with respect to the plane of rotation may be converted to direction with respect to physical coordinates (e.g., with respect to north and horizon) in accordance with relative plane of rotation and a selected zero azimuth. The DF antenna system may also comprise orientation detection module, e.g., including at least one of (and preferably both) an inclinometer and compass units configured to provide data on relative orientation of the DF antenna system with respect to selected geographical coordinate system. The orientation detection module may alternatively utilize gyroscopic or accelerometer-based orientation detection system.

In some embodiments, the DF antenna system may also comprise a control circuit (also referred to at times as control unit). The control circuit may comprise an operation module configured to operate a motor unit for operating the rotatable platform with a selected motion pattern. The motor may operate to rotate the rotatable platform at selected angular frequency, varying angular frequency, and/or operate in a selected back-and-forth motion pattern within a selected angular range. The control circuit is generally configured for processing data on phase difference between signal portions collected by the two or more antenna units with respect to data on angular position of the rotatable platform to determine data on direction from which a collected signal arrives. In some embodiments, the control circuit may utilize analog processing. In some other embodiments, the control circuit may also comprise a processing unit comprising one or more processors and configured for receiving data on phase difference between signal portions collected by two or more antenna units from the signal collection circuit, and for processing the data on phase difference in accordance with data on angular position of the rotatable platform to generate output data indicative of direction of signal origin with respect to a selected reference direction defined by the system.

Further, in some embodiments of the present invention, a DF antenna system as described herein may be mounted on a mobile platform (e.g., land or aerial vehicle, unmanned vehicle, etc.). The DF antenna system may thus comprise, or be connectable with, three axes orientation detection module, such as inclinometer and compass, gyroscopic orientation detection module etc., providing data on alignment of the DF system with respect to three axis geographical coordinate system. The DF antenna system may comprise, or be associated with, a control unit configured for receiving data on current orientation from the orientation detection module, and data on direction of signal origin from the DF antenna system, and for processing the received data by conversion of direction coordinates in accordance with the three-axis geographical coordinate system.

Thus, according to a broad aspect, the present invention provides a direction finder antenna system comprising:
(a) a rotatable platform comprising at least two antenna units at selected distance between them;
(b) a motor configured for moving the rotatable platform at a motion pattern;
(c) signal collection circuit configured for receiving data on signal portions collected by said at least two antenna units with respect to different angular positions of said at least two antenna units and generate output data indicative of direction of origin of collected signal.

According to some embodiments, the selected motion pattern comprises complete circular motion at a selected rotation speed. The rotation speed may be selected in the range of 50-1000 RPM (revolutions per minute). The rotation speed may be greater than 1000 RPM. Alternatively, the rotation speed may be lower than 50 RPM.

According to some embodiments, the selected motion pattern comprises back-and-forth motion within a selected angular section at a selected motion frequency. The motion frequency may be selected in the range of 50-1000 RPM. The motion frequency may be greater than 1000 RPM. Alternatively, the motion frequency may be lower than 50 RPM.

According to some embodiments, the speed of movement of the rotatable platform may vary within said selected motion pattern.

According to some embodiments, the at least two antenna units may be positioned along a section of rotation circle, not forming a diameter with respect to rotation.

According to some embodiments, the at least two antenna unit may be positioned at equal distances from axis of rotation.

According to some embodiments, pairs of the at least two antenna units may be positioned at 180 degrees relative to rotation axis of said rotatable platform.

According to some embodiments, the at least two antenna units may be positioned at different distance from center of rotation of said rotatable platform.

According to some embodiments, the at least two antenna units may be omnidirectional antenna units.

According to some embodiments, the at least two antenna unit may be mounted on rotatable antenna mounts, said rotatable antenna mounts being rotated at rotation speed equal to rotation speed of said rotatable platform at opposite direction, thereby enabling maintaining headings of the corresponding antenna units. The at least first and second antenna units may be directional antenna units positioned on said rotatable antenna mounts with similar heading.

According to some embodiments, the direction finder antenna system may further comprise a control circuit connected to said at least first and second antenna units for receiving input data indicative of electromagnetic signal portions collected by said first and second antenna units, said control circuit is configured for determining data indicative of phase difference between signal portions collected by said first and second antenna units for different angular positions of said rotatable platform.

The control circuit may be configured for determining a relation between phase difference between signal portions collected by said first and second antenna units and angular orientation of said rotatable platform. The control circuit may utilize analog or digital processing.

According to some embodiments, the relation between phase difference between signal portions collected by said first and second antenna units and angular orientation of said rotatable platform is indicative of azimuth of origin of the collected signal with respect to a predetermined angular orientation of said rotatable platform within plane of rotation thereof.

According to some embodiments, the control circuit may be configured for determining magnitude of said relation between phase difference of signal portions collected by said first and second antenna units and angular orientation of said rotatable platform, said magnitude being indicative of elevation of origin of the collected signal with respect to plane of rotation of said rotatable platform.

According to some embodiments, the direction finder antenna system may further comprise an orientation detection module configured for providing data on relative orientation with respect to selected geographical coordinate system.

The orientation detection module may comprise at least one of inclinometer, compass, gyroscopic orientation system, and accelerometer.

According to some embodiments, the direction finder antenna system may further comprise an inclinometer positioned to provide data indicative of inclination of plane of motion of said rotatable platform with respect to a selected external plane, thereby enabling coordinate conversion of direction data to a selected set of geographical coordinates.

According to some embodiments, the direction finder antenna system may further comprise a direction unit configured to provide data on relative orientation of reference direction of said direction finder antenna system and a selected geographical direction (e.g., north), thereby enabling conversion of azimuth data with respect to said direction finder antenna system to a selected geographical coordinate.

According to some embodiments, the direction finder antenna system may be configured to be mounted of a mobile platform. Such mobile platform may be a land or aerial vehicle. The DF antenna system may utilize orientation data of the mobile platform for determining a relation between internal (reference) coordinate system and a selected set of geographical coordinates for determining direction toward origin of one or more collected signal in geographic coordinate system.

According to one other broad aspect, the present invention provides a method for use in finding direction of origin of electromagnetic radiation signal, the method comprising:
(a) providing at least first and second antenna units positioned on a rotatable platform;
(b) moving said rotatable platform in a selected motion pattern;
(c) determining phase difference in signal portions collected by said first and second antenna units; and
(d) determining a relation between the phase difference in collected signal portions and angular position of said rotatable platform and utilizing said relation to determine azimuth of said origin within a plane defined by said rotatable platform.

According to some embodiments, the selected motion pattern comprises complete circular motion at a selected angular speed.

According to some embodiments, the selected motion pattern comprises back-and-forth motion at a selected motion frequency.

According to some embodiments, the method may further comprise determining magnitude of said phase difference in collected signal portions and angular position of said rotatable platform throughout rotation path of said rotatable platform and utilizing said magnitude to determine elevation of said origin with respect to said plane define by the rotatable platform.

According to some embodiments, the method may further comprise maintaining heading of said first and second antenna units toward a common direction and designating said common direction as reference azimuth direction within said plane.

According to yet another broad aspect, the present invention provides a system comprising at least two antenna units, said at least two antenna units being positioned on a rotatable platform at a selected distance between them, said rotatable platform is adapted for rotating at a selected angular frequency, said at least two antenna units being configured for collecting electromagnetic radiation of a selected frequency range and to provide output data indicative of phase relation between signal portions collected by said at least two antenna units.

The system may further comprise a control circuit connectable to said at least two antenna units, said control circuit is adapted for receiving input data indicative of phase relations being signal portions collected by said at least two antenna units, and for utilizing said phase relation with respect to angular frequency of said rotatable platform to determine data on direction of origin of said signal portions.

According to yet further broad aspect, the present invention provides an aerial vehicle comprising one or more rotors, at least first and second two antenna units mounted on respectively first and second positions on at least one of said rotors, and a signal collection circuit configured for receiving data on signal portions collected by said first and second antenna units while rotating with said at least one rotor, and analyze phase difference between the signal portions with respect to different angular positions of said rotor thereby generating output data indicative of direction of origin of collected signal.

According to some embodiments, the aerial vehicle may further comprise at least one orientation detection module configured for providing data on orientation of said aerial vehicle with respect to geographical coordinates, and a processing unit configured for receiving said data on orientation for processing said output data to thereby determine data on direction of origin of collected signal in a selected set of geographical coordinates.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
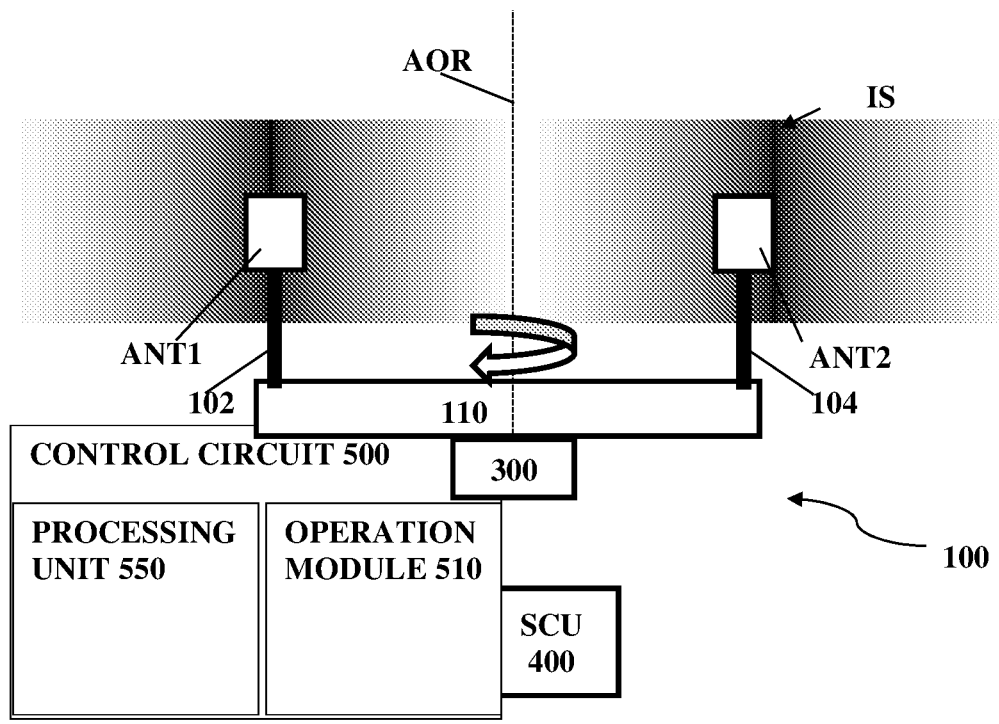
FIG. 1 illustrates schematic configuration of a direction-finding antenna system according to some embodiments of the present invention.

The present invention provides a system and a technique for determining direction of origin of electromagnetic signals. The present technique enables very broad band direction finding and enables determining at least azimuth and preferably both azimuth and elevation of signal origin. Reference is made to FIG. 1 illustrating a direction finding (DF) antenna system 100 according to some embodiments of the present invention. The antenna system 100 includes at least two antenna units (ANT1 and ANT2) positioned on respective antenna mounts (102 and 104) at a selected distance between them and placed on a rotatable platform 110. The rotatable platform is generally connected to a motor 300 configured to rotate the platform 110 at a selected motion pattern about a rotation axis AOR. The motion pattern may be associated with complete circular motion at a selected rotation speed. In some further embodiments, the motion pattern may be formed by back-and-forth motion within a selected angular section of a circle. Motor 300 may be a stepper motor, enabling to directly utilize data on orientation of the rotatable platform 110. Additionally, or alternatively, motor 300 may be any motor type, and the DF antenna system 100 may include an angular orientation locator, providing data indicative of momentary orientation of the rotatable platform 110.

The antenna units ANT1 and ANT2 are connected to a signal collection circuit (SCU) 400 and configured to transmit data on collected signals to the SCU 400. The SCU 400 is configured and operable to receive data on collected input signals IS and determine phase shift (delay) between the signal collected by two antenna units. The SCU 400 thus generates output data relating to phase differences between signal portions collected by two antenna units for different angular positions of the rotatable platform 110. The collected signal IS is represented in FIG. 1 in gray level indicating phase variation along propagation path of the signal.

The system 100 may also include a control circuit 500 configured for controlling operation of the system and processing collected data. The control circuit 500 may include an operation module 510 configured for generating operation commends, e.g., for operating the motor 300 to rotate the rotatable frame 110 at a selected rotation speed. Additionally, the control circuit 500 may include a processing unit 550. The control circuit may also include one or more of user interface, communication module and storage, configured to providing input and output channels while not specifically illustrated in FIG. 1. The control circuit 500 may also include the SCU 400 and/or motor 300 for operation of the DF antenna system 100. Alternatively, as indicated above, the SCU 400 and Motor may be separated from the control circuit 500.

During operation of the DF antenna system 100, the motor 300 is operated for moving the rotatable platform 110 at a selected motion pattern and certain rotation speed (angular frequency). As described in more detail further below, the motion pattern may be formed by complete circular motion and/or by certain back-and-forth motion within a selected angular section. The antenna units ANT1 and ANT2 are operated for collecting electromagnetic signals of selected frequency range (typically broadband, or any selected frequency range) and transmitting data on the collected signals to the SCU 400. The SCU 400 generally operates for determining phase difference or phase delay between signal portions received by the first and second antenna units ANT1 and ANT2 and transmit corresponding data to the control circuit 500. Generally, according to some embodiments, the momentary rotation speed, or angular frequency, of motion of the rotatable platform may be sufficiently low to avoid meaningful Doppler shifts in the collected signals and enable the SCU to determine phase difference between signal portions for a given angular orientation of the rotatable platform. More specifically, given signal frequency f, providing signal wavelength $$\lambda = \frac{c}{f},$$

where c is the speed of light, the angular frequency of motion may preferably be selected to provide $$\omega f \Delta t < \frac{c}{4\pi d},$$

where $\Delta t$ is the time between consecutive measurements. This indicates that the product of angular frequency of motion and signal frequency is selected to be sufficiently small to provide unambiguous direction-finding data.

In some general configurations, the rotatable platform may be rotated in complete circular rotation having rotation speed in range of 50-1000 RPM, or 60-500 RPM or 100-200 RPM. In other configurations, the rotatable platform may be moved in back-and-forth motion pattern typically oscillating with selected motion frequency. Such motion frequency may be in range of 50-1000 revolutions per minute (RPM), or 60-500 RPM or 100-200 RPM. It should be noted that variations in rotation speed may result in variation of the time of data collection, while generally not affecting the direction finding (DF) data itself. More specifically, the present technique generally utilizes variation in phase difference of signal portions collected by two different antenna units with respect to angular orientation of the rotatable platform at time of signal collection. Rotation of the antenna units at a selected motion pattern provides for effective means for collecting signal portions in different angular orientations of the antenna units.

As indicated, the SCU 400 operates to determine phase difference between signal portions collected by antenna units ANT1 and ANT2. If the signal portions originate from a common source, at relatively long distance from the system 100, and the source is within a common plane as plane of rotation of the rotatable platform 110 (e.g., rotating platform is horizontal), the phase difference between the signal portions for an angular position $\theta$ of the rotatable platform is generally given by:

$$2\pi \frac{d}{\lambda} \sin(\theta - \phi) \quad \text{(equation 1)}$$

where d is the distance between the antenna units, $\lambda$ is the wavelength of the signal and $\phi$ is the azimuth angle of the signal origin within the plane of rotation. Accordingly, the DF antenna system 100 of the present invention may operate to determine shift of the phase difference between the signal portions, with respect to a selected direction defining azimuth 0°, and accordingly determine azimuth of signal origin. Typically, the DF antenna system of the present invention determines data on direction of signal origin within internal coordinate system, and direction with respect to geographical coordinate system is determined by coordinate conversion.

The two or more antenna units ANT1 and ANT2 may be omnidirectional antenna units (e.g., monopole or dipole antenna units). In some embodiments, the DF antenna system may utilize directional antenna units operating on rotatable antenna mounts (102 and 104). In this configuration, the rotatable antenna mounts 102 and 104 are configured and connected to be rotate at similar angular frequency and opposite direction as the rotatable platform 110. This provides the antenna units ANT1 and ANT2 to be facing similar selected direction throughout rotation of the platform 110. This configuration defines a selected reference direction (azimuth 0°) and enables to enhance signal to noise ratio by reducing collection of radiation other than the selected signal.

Figure 2:
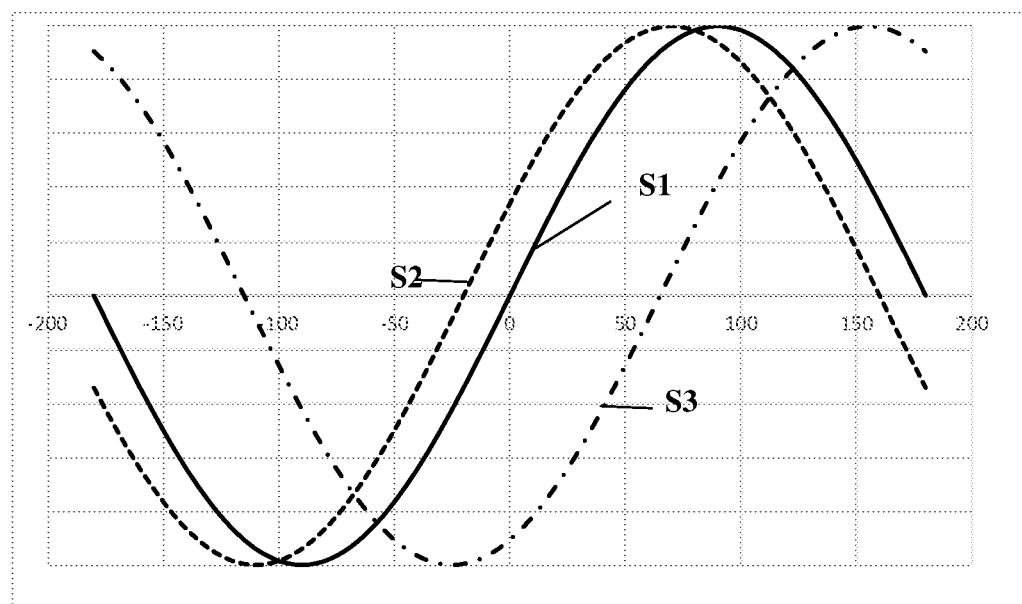
FIG. 2 exemplifies detection of signal origin azimuth according to some embodiments of the invention.

Reference is made to FIG. 2 showing plot of phase difference between signal portions as a function of angular position of the antenna units for signals arriving from 0°, −20°, and 65°. The vertical axis in this figure is given in arbitrary units, normalized by a factor of $$2\pi \frac{d}{\lambda}.$$

As shown, the phase difference between signal portions varies as a function of the angular position of the antenna units, resulting in a sine wave response. Plot S1 is indicative of signal arriving from azimuth 0°, plot S2 is indicative of a signal arriving from azimuth −20°, and plot S3 is indicative of signal arriving from azimuth 65°. In this example, azimuth 0° is a selected direction where the angular position of the antenna units ANT1 and ANT2 for this direction provide similar path, i.e., a line connecting the two antenna units is perpendicular to radial axis at 0=0.

As shown in FIG. 2, speed of motion (rotation and/or back and forth speed) may be omitted in processing, and the processing generally utilizes data on angular orientation of the rotatable platform and respective phase difference at that angular orientation. Further, when operating in back-and-forth motion pattern, the DF antenna system may collect partial data associated with the partial angular section covered by the back-and forth motion. However, such partial data may be sufficient of determining azimuth to signal source, being included in the covered angular section or not.

Figure 3:
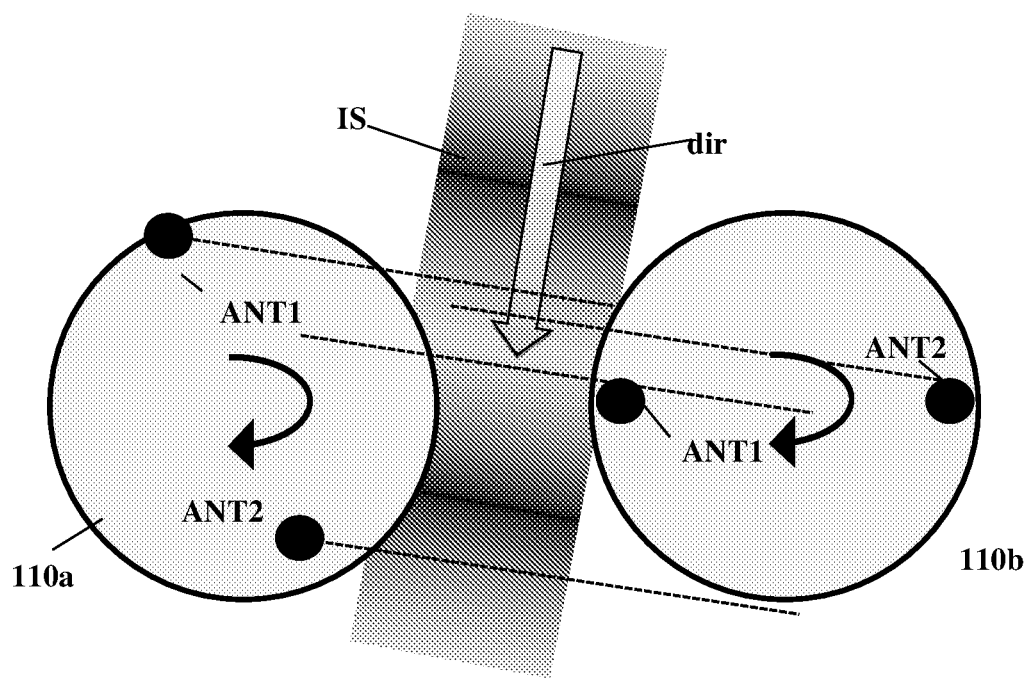
FIG. 3 illustrates the antenna units' positions with respect to input signal at two different angular positions of the rotatable platform.

FIG. 3 illustrates two orientations of the rotatable platform 110 and two antenna units ANT1 and ANT2 with respect to collected waveform of input signal IS. Direction of the collected signal is illustrated by an arrow dir and the waveform of the signal is illustrated by shade of the signal pattern. Relative phase of the signal collected by each of the antenna units ANT1 and ANT2 for two different orientations of the DF antenna system are marked by dotted lines perpendicular to direction dir of the signal. In a first orientation platform 110a is positioned at angular orientation providing that antenna unit ANT1 is closer to the signal origin. Accordingly, as shown by the dotted lines, signal portions collected by ANT1 and ANT2 at that orientation experience relatively large phase difference. In a second orientation 110b, the angular orientation of the antenna units ANT1 and ANT2 results is almost perpendicular to direction of signal propagation dir, resulting is relatively smaller phase difference in signal collection by the different antenna units ANT1 and ANT2.

In this connection it should be noted that a distance d between the antenna units ANT1 and ANT2 may be selected in accordance with desired size (form factor) of the DF antenna system, while allowing direction finding in broad frequency range. More specifically, the distance d between the antenna units may be around µ/2, additionally or alternatively, the distance d may be larger than λ/2 or smaller than λ/2. As indicated above, distance d, and rotation/ movement speed of the rotatable platform may preferably satisfy the condition $$2\pi\omega\Delta t \frac{d}{\lambda} < \frac{1}{2}.$$

Further, as visible from equation 1, the relation between distance d and the wavelength mostly affects the magnitude of the phase difference, while azimuth to signal origin may be determined based on shifting of the oscillating phase difference, according to sine function in accordance with equation 1. In some situations, the phase difference may be translated to time delay, e.g., for shockwave or broadband signals. More specifically, if the signal carries certain encoded information, the phase difference as indicated above may be identified as delay between the signal collected by one antenna unit with respect to the other.

Figure 4:
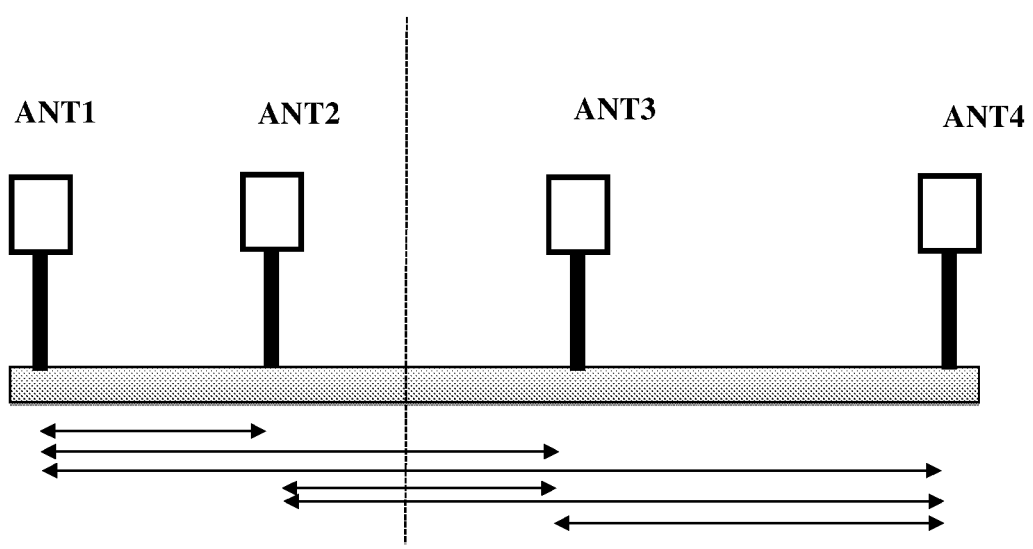
FIG. 4 exemplifies rotatable platform configuration carrying four antenna units having different distances between them according to some embodiments of the present invention.

To enable optimization of phase difference magnitude, the rotatable platform 110 may include an arrangement of additional antenna units, positioned at different distances between them. In this connection, reference is made to FIG. 4 illustrating a rotatable platform carrying four antenna units ANT1-ANT4 positioned at different spacings between them. The rotatable platform is configured to be rotated about a selected rotation axis, and the antenna units are operated in pairs for determining phase difference between signal portions collected by antenna elements of a pair as a function of platform angular position. The antenna units may operate in pairs, i.e., defining a first and a second antenna units for collecting electromagnetic signals and determining phase difference between signal portions collected by the first and second antenna units. This enables the system to select first and second antenna units providing a distance d satisfying the relation $$2\pi\omega\Delta t \frac{d}{\lambda} < \frac{1}{2}$$

as described above to increase direction finding accuracy and avoid ambiguity in determined direction. It should be noted that the arrangement of four antenna units is illustrated herein as an example. The rotatable platform may utilize three or more antenna units, typically providing arrangement having various distances d between pairs of antenna units to enable direction finding for broad range of signal wavelengths.

Figure 5:
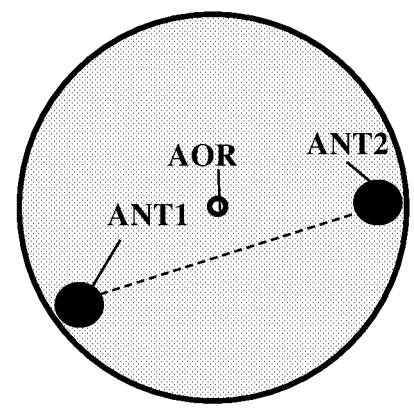
FIG. 5 exemplifies possible arrangement of the antenna units of a circular rotatable platform.

As can be understood from the configuration of FIG. 4, the antenna units may or may not be arranged in similar distance with respect to the rotation axis. Accordingly, the rotation axis may be positioned at a central region of the rotatable platform 110 or not. Further, pairs of the antenna units may be positioned with 180° relative angular position with respect to the rotation axis. Alternatively, the antenna units may be positioned at different angular position that do not align with diameter of rotation cycle. This is exemplified in FIG. 5 showing a rotatable platform 110 carrying first and second antenna units. In this example the antenna units are not aligned with axis of rotation (AOR), i.e., a line connecting the first and second antenna units does not go through the AOR. In this arrangement, a reference direction/azimuth is typically determined as a selected direction extending from the central axis of rotation (AOR) within plane of rotation of the rotatable platform. In some embodiments the reference azimuth may be selected to be perpendicular to a line connecting the first and second antenna units, thus defining reference (zero) direction at position where phase difference between first and second antenna units is zero. Generally, arrangement of the antenna units on the rotatable platform 110 is considered in analysis of signal source direction based on the phase difference as a function of angular orientation. Typically, in some preferred embodiments, reference angular orientation may be determined in accordance with orientation of an axis in the rotation plane that goes through AOR.

Figure 6:
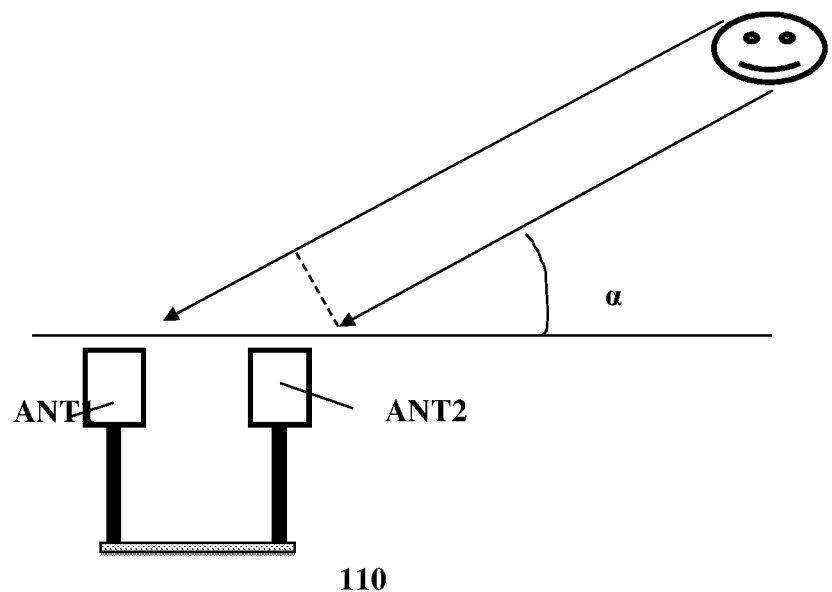
FIG. 6 exemplifies determining of elevation of signal origin according to some embodiments of the present invention.

The direction-finding antenna system of the present invention is generally not limited for determining azimuth of signal origin, i.e., azimuth within the plane of rotation. The technique of the present invention can effectively determine direction of signal origin including azimuth and elevation with respect to the plane of rotation. This enables the system to obtain additional data of signal origin, and e.g., to detect two-dimensional direction of flying units in addition to ground/marine sources of electromagnetic signals. FIG. 6 illustrates the effect of elevation a on path of signal portions collected by different antenna elements ANT1 and ANT2 at certain angular position of the rotatable platform 110. As shown, for any angular position, other than those that result in zero phase difference between the antenna units, the elevation angle further affects the phase difference between signal portions. To this end, for signal arriving with certain elevation angle a with respect to the rotation plane, the effective distance between the antenna units d changes and can generally be expressed by $$2\pi \frac{d}{\lambda} \sin(\theta - \phi) \cos(\alpha) \qquad \text{(equation 2)}$$

Figure 7:
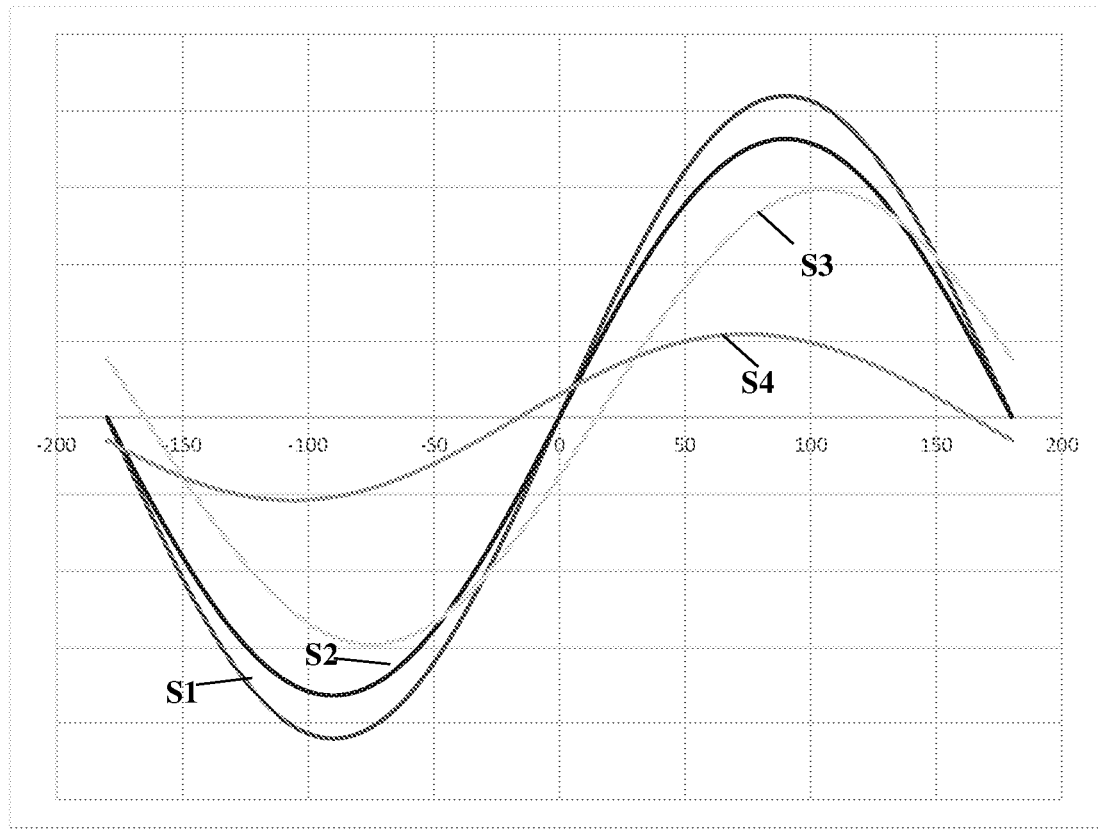
FIG. 7 exemplifies azimuth and elevation data determined according to some embodiments of the present invention.

Thus, change in elevation results in variation in magnitude of the phase difference. More specifically, a collected signal originating from a source located within the plane of rotation, elevation is zero, experiences maximal phase difference for 0=90°. This is while a signal origination from a source that is directly above the system, at angular elevation of 90°, the phase difference between the antenna units is not dependent on the angular position, where in intermediate elevations, the phase difference varies with the angular elevation. Variations in elevation of signal origin are exemplified in FIG. 7 showing a graph of the phase difference between signal portions as determined in accordance with equation 2 for four different sources S1-S4. As shown, phase of the sine wave is shifted with azimuth variation of the signal source, providing signals S1 and S2 arriving from azimuth 0°, signal S3 originating from azimuth 15°, and signal S4 originating from azimuth −16° (or 344°). Additionally, based on magnitude of the phase difference, the present technique enables to determine that while signal S1 originates from elevation 0° with respect to plane of rotation, signals S2-S4 originate from higher absolute value of elevation. The direction of elevation may be determined by physical understanding of possible positions of signal source, and/or by shifting the plane of rotation of the system. In this example signal S2 originate from elevation 30°, signal S3 from elevation 45°, and signal S4 originates from elevation of 75°. The vertical axis in this figure is given in arbitrary units, relating to a factor of $$2\pi \frac{d}{\lambda}.$$

Accordingly, the DF antenna system may generally be positioned at any selected orientation with respect to plane of horizon and provide data on direction of signal source in an internal coordinate system. The DF antenna system may further include, or be associated with, a three-axis orientation detection module, providing data on relative orientation with respect to three axes of geographical coordinate system. Such orientation detection module may include one or more of inclinometer and/or compass units, gyroscope system, accelerometer, or any other orientation detection module. The orientation detection module is configured to provide data on relation between internal coordinate system and geographical coordinates, enabling coordinate conversion and determining direction to signal source in a selected set of geographical coordinates.

Figure 8:
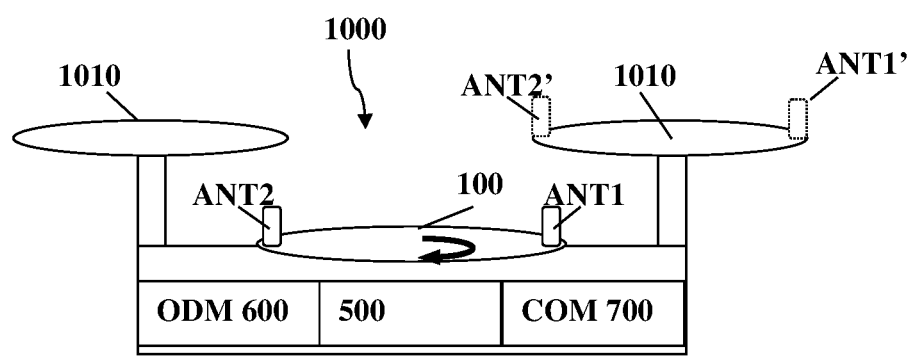
FIG. 8 illustrates a mobile unit, exemplified by an aerial vehicle, configured with direction finder system according to some embodiments of the invention.

Further, the DF antenna system may be mounted on a mobile platform such as land or aerial vehicle (manned or unmanned). The DF antenna system may utilize orientation data provided by the orientation detection module that may be used for continuously or periodically determine relation between internal coordinates of the DF antenna system and a selected set of geographical coordinate system to provide data on direction to signal origin of one or more collected signals. Reference is made to FIG. 8 exemplifying a DF antenna system 100 mounted on a mobile platform 1000, exemplified as an unmanned aerial vehicle including rotors 1010. The DF antenna system 100 is configured as described herein above and includes an Orientation detection module (ODM) 600. The control circuit 500 is configured for utilizing orientation data from the ODM 600 for determining a relation between internal reference coordinate system (including plane of rotation and reference azimuth) and a selected set of geographical coordinates. The control circuit may operate for transmitting data on signal source direction and selected geographical coordinates (e.g., current heading, pitch, and roll of the mobile unit 1000) using communication module COM 700 of the mobile unit 1000.

It should further be noted that in some embodiments, the rotors 1010 of mobile unit 1000 may be used as the rotatable platform. In this connection, two or more antenna unit, e.g., ANT1' and ANT2' illustrated in dashed line may be mounted on rotors 1010 of the mobile unit 1000. Mounting of antenna units on the rotors 1010 is generally done considering weight distribution as known in design of aerial vehicle.

In this connection it should be noted that phase difference between signal portions may vary due to a combination of wavelength of the signal and elevation of the signal source. Accordingly, the present technique may further utilize determining central wavelength of the collected signal and utilize this data for determining data on elevation of the signal source. To this end, the control circuit (500 in FIG. 1) may operate for determining wavelength (frequency) of the collected signal and utilize this wavelength data for determining elevation of signal source.

In some embodiments, the control circuit may operate to determine a Fourier Transform of the phase difference between signal portions, with respect to angular orientation of the rotatable platform. In some embodiments, the rotatable platform may be rotated at a constant rotation speed and the control circuit may operate for determining phase difference between signal portions with respect to time. Generally, considering Fourier Transform of the phase difference between signal portions collected by the different antenna units, magnitude of the Fourier Transform at the rotation frequency of the unwrapped phase difference between the two antennae is indicative of the elevation of the emitter relative to our system. This is while angle of the complex number of the Fourier Transform at the corresponding frequency of the unwrapped phase difference between the two antennas is indicative of the azimuth of the emitter relative to our system.

It should be noted that additional other techniques, being Fourier Transform (e.g., FFT) or others as known in the art, that can be used to determine azimuth and elevation. In various applications, the use of one or more Fourier Transform algorithms, such as FFT, may provide fast and efficient processing. Other methods may be required if the rotating platform 110 has rotated only a part of a circle.

Accordingly, as described above the present technique provides for a direction-finding antenna system. The antenna system may operate in broad frequency range and determine data on azimuth and elevation of signal source with respect to the system and a selected reference direction.

The invention claimed is:

1. A direction finder antenna system, comprising:
   a rotatable platform comprising at least two antenna units positioned on the rotatable platform at selected distance therebetween;
   a motor configured for moving the rotatable platform at a motion pattern;
   a control circuit comprising a signal collection circuit configured for receiving data on signal portions collected by said at least two antenna units with respect to different angular positions of said at least two antenna units and generate output data indicative of direction of origin of collected signal;
   wherein said control circuit is configured for determining data indicative of phase difference between signal portions collected by said first and second antenna units for different angular positions of said rotatable platform between absolute maximal and minimal phase difference, and for determining magnitude of said relation between phase difference between signal portions collected by said first and second antenna units and angular orientation of said rotatable platform, and provide output data indicative of direction of origins of the collected signal comprising azimuth within plane of rotation of said rotatable platform and elevation with respect to said plane determined in accordance with a zero phase difference position, wherein the selected distance between the at least two antenna units is smaller than a half wavelength of the collected signal.

2. The direction finder antenna system of claim 1, wherein said selected motion pattern comprise complete circular motion at a selected rotation speed.

3. The direction finder antenna system of claim 2, wherein said rotation speed is selected in a range of 50-1000 RPM.

4. The direction finder antenna system of claim 2, wherein said rotation speed is greater than 1000 RPM.

5. The direction finder antenna system of claim 2, wherein said rotation speed is lower than 50 RPM.

6. The direction finder antenna system of claim 1, wherein said selected motion pattern comprises back-and-forth motion within a selected angular section at a selected motion frequency.

7. The direction finder antenna system of claim 6, wherein said motion frequency is selected in the range of 50-1000 RPM.

8. The direction finder antenna system of claim 6, wherein said motion frequency is greater than 1000 RPM.

9. The direction finder antenna system of claim 6, wherein said motion frequency is lower than 50 RPM.

10. The direction finder antenna system of claim 1, wherein speed of movement of the rotatable platform varies within said selected motion pattern.

11. The direction finder antenna system of claim 1, wherein said at least two antenna units are positioned along a section of rotation circle, not forming a diameter with respect to rotation.

12. The direction finder antenna system of claim 1, wherein said at least two antenna unit are positioned at equal distances from axis of rotation.

13. The direction finder antenna system of claim 1, wherein said at least two antenna units are positioned at 180 degrees relative to rotation axis of said rotatable platform.

14. The direction finder antenna unit of claim 1, wherein said at least two antenna units are positioned at different distance from center of rotation of said rotatable platform.

15. The direction finder antenna system of claim 1, wherein said at least two antenna units are omnidirectional antenna units.

16. The direction finder antenna system of claim 1, wherein said at least two antenna unit are mounted on rotatable antenna mounts, said rotatable antenna mounts being rotated at rotation speed equal to rotation speed of said rotatable platform at opposite direction, thereby enabling maintaining headings of the corresponding antenna units.

17. The direction finder antenna system of claim 16, wherein said at least first and second antenna units are directional antenna units positioned on said rotatable antenna mounts with similar heading.

18. The direction finder antenna system of claim 1, wherein said control circuit is configured for determining a relation between phase difference between signal portions collected by said first and second antenna units and angular orientation of said rotatable platform.

19. The direction finder antenna system of claim 18, wherein said relation between phase difference between signal portions collected by said first and second antenna units and angular orientation of said rotatable platform being indicative of azimuth of origin of the collected signal with respect to a predetermined angular orientation of said rotatable platform within plane of rotation thereof.

20. The direction finder antenna system of claim 1, further comprising an orientation detection module configured for providing data on relative orientation with respect to selected geographical coordinate system thereby enabling coordinate conversion of direction data to a selected set of geographical coordinates.

21. The direction finder antenna system of claim 1, wherein said orientation detection module comprises at least one of inclinometer, compass, gyroscopic orientation system, and accelerometer.

22. The direction finder antenna system of claim 1, further comprising a direction unit configured to provide data on relative orientation of reference direction of said direction finder antenna system and a selected geographical direction (e.g., north), thereby enabling conversion of azimuth data with respect to said direction finder antenna system to a selected geographical coordinate.

23. The direction finder antenna system of claim 1, configured to be mounted on a mobile platform.

24. A method for use in finding direction of origin of electromagnetic radiation signal, the method comprising:
    providing at least first and second antenna units positioned on a rotatable platform;
    moving said rotatable platform in a selected motion pattern;
    determining phase difference in signal portions collected by said first and second antenna units; and
    determining a relation between the phase difference in collected signal portions and angular position of said rotatable platform between absolute maximal and minimal phase difference and utilizing said relation to determine azimuth of said origin within a plane defined by said rotatable platform in accordance with a zero phase difference position; and
    determining magnitude of said phase difference in collected signal portions and angular position of said rotatable platform throughout rotation path of said rotatable platform and utilizing said magnitude to determine elevation of said origin with respect to said plane define by the rotatable platform; and
    wherein providing at least first and second antenna units comprises providing a distance d between the first and second antenna units that is smaller than a half wavelength of the collected signal.

25. The method of claim 24, wherein said selected motion pattern comprises complete circular motion at a selected angular speed.

26. The method of claim 24, wherein said selected motion pattern comprises back-and-forth motion at a selected motion frequency.

27. The method of claim 24, further comprising maintaining heading of said first and second antenna units toward a common direction and designating said common direction as reference azimuth direction within said plane.

28. A system comprising at least two antenna units, said at least two antenna units being positioned on a rotatable platform at a selected distance between them, said rotatable platform is adapted for rotating at a selected angular frequency, said at least two antenna units being configured for collecting electromagnetic radiation of a selected frequency range and to provide output data indicative of phase relation between signal portions collected by said at least two antenna units between absolute maximal and minimal phase difference, thereby providing data indicative of direction of origin of said electromagnetic radiation comprising azimuth and elevation with respect to the plane of rotation; wherein azimuth direction is determined in accordance with zero phase difference position, and wherein a distance d between the at least two antenna units positioned on the rotatable platform is smaller than a half wavelength of the collected signal portions.

29. The system of claim 28, further comprising a control circuit connectable to said at least two antenna units, said control circuit is adapted for receiving input data indicative of phase relations being signal portions collected by said at least two antenna units, and for utilizing said phase relation with respect to angular frequency of said rotatable platform to determine data on direction of origin of said signal portions.

30. An aerial vehicle comprising one or more rotors, at least first and second two antenna units mounted on respectively first and second positions on at least one of said rotors, and a signal collection circuit configured for receiving data on signal portions collected by said first and second antenna units while rotating with said at least one rotor, and analyze phase difference between the signal portions with respect to different angular positions of said rotor between absolute maximal and minimal phase difference, thereby generating output data indicative of direction of origin of collected signal in accordance with a zero phase difference position, wherein said output data comprising azimuth and elevation with respect to the plane of rotation, wherein a distance d between the first and second positioned on at least one of said rotors is smaller than a half wavelength of the collected signal.

31. The aerial vehicle of claim 30, further comprising at least one orientation detection module configured for providing data on orientation of said aerial vehicle with respect to geographical coordinates, and a processing unit configured for receiving said data on orientation for processing said output data to thereby determine data on direction of origin of collected signal in a selected set of geographical coordinates.

* * * * *